May 5, 1942.  A. PLACEK  2,281,616
PROCESS AND APPARATUS FOR TREATING LIQUIDS WITH A GASEOUS MEDIUM
Filed March 1, 1937  2 Sheets-Sheet 1
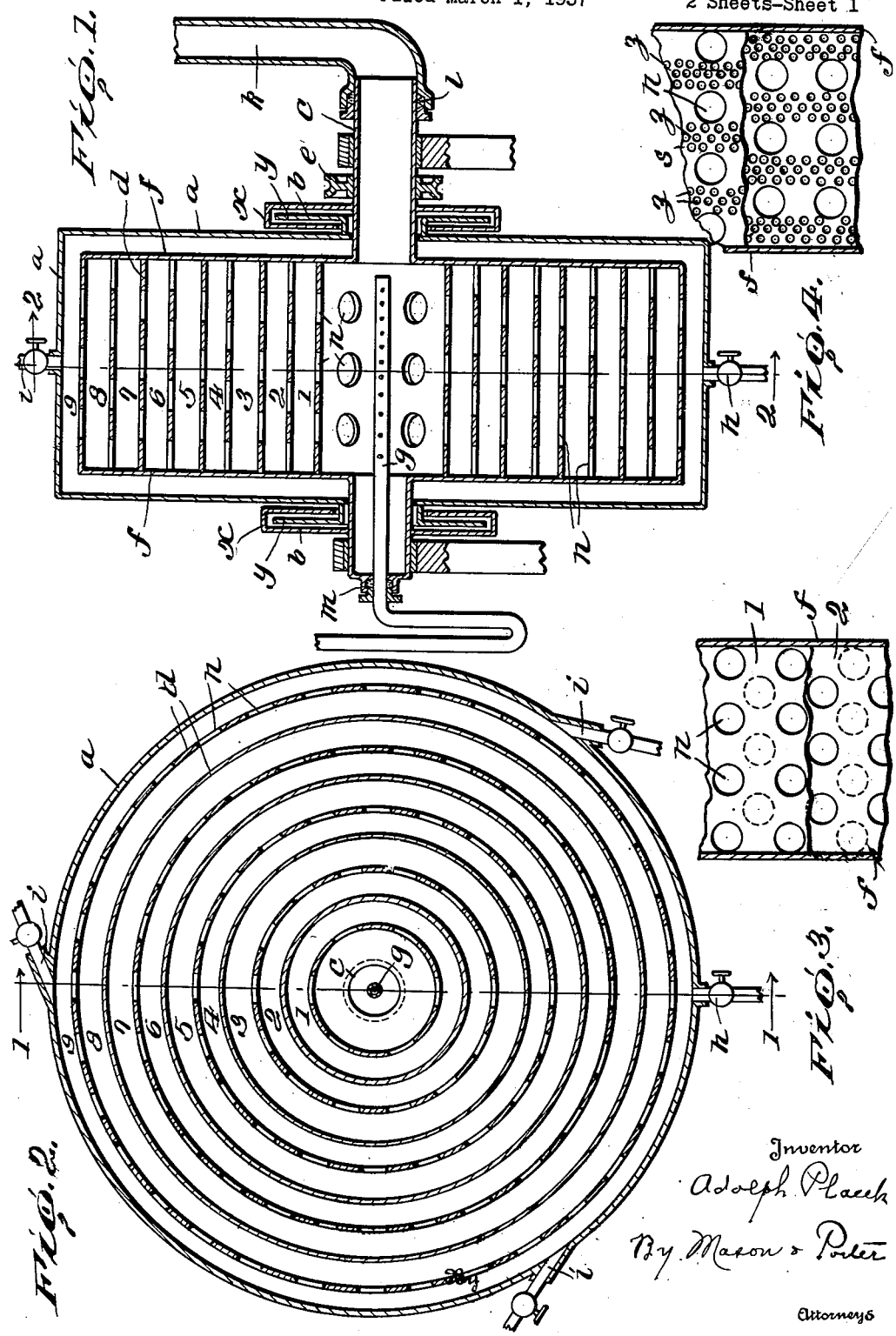

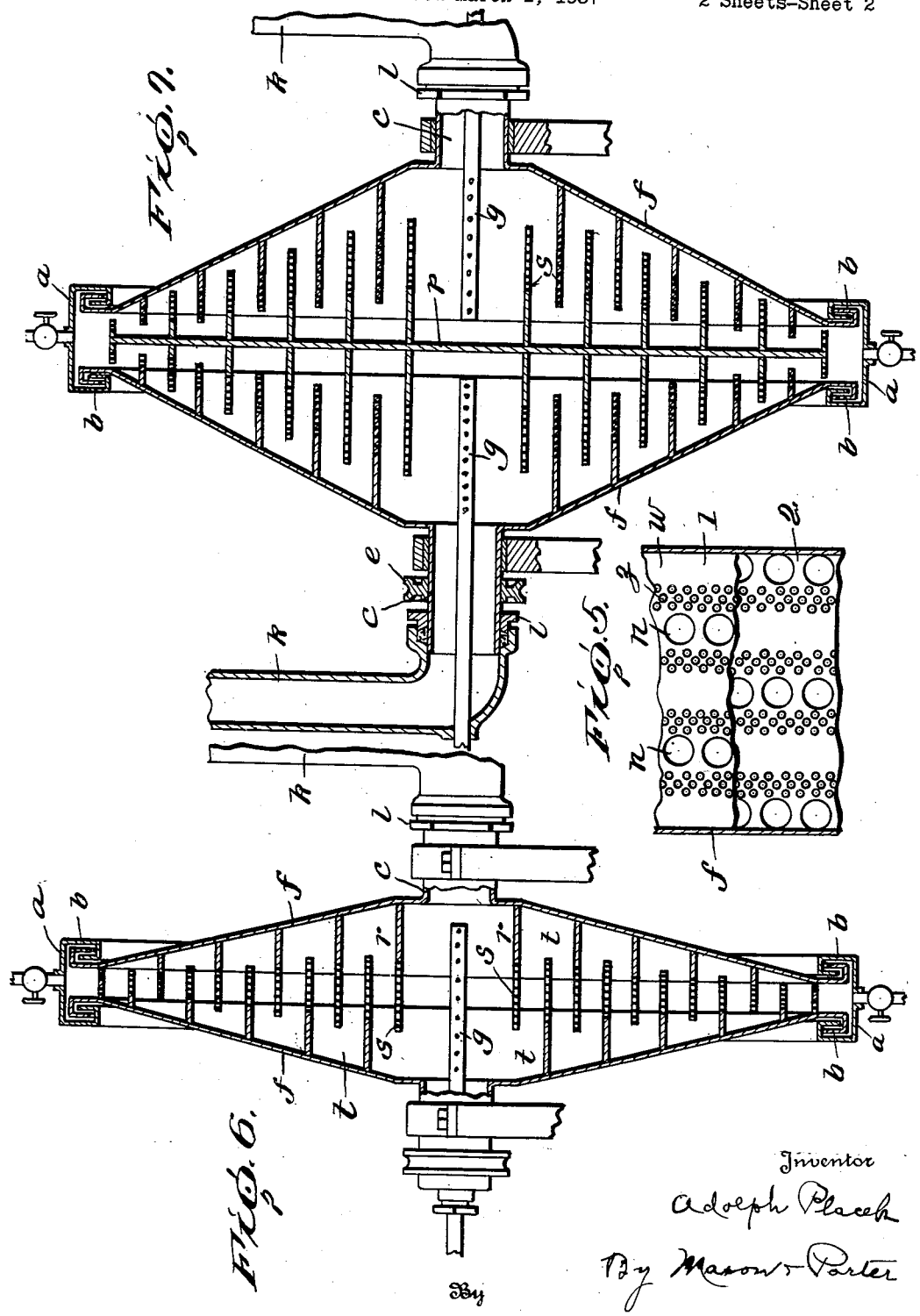

Patented May 5, 1942

2,281,616

UNITED STATES PATENT OFFICE 2,281,616

PROCESS AND APPARATUS FOR TREATING LIQUIDS WITH A GASEOUS MEDIUM

Adolph Placek, Jackson Heights, N. Y.

Application March 1, 1937, Serial No. 128,521

3 Claims. (Cl. 261—83)

The invention relates to new and useful improvements in a process of treating a liquid with a gaseous medium, and an apparatus for efficiently carrying out said process.

An object of the invention is to provide a process of treating a liquid with a gaseous medium wherein centrifugal force is utilized for causing a flow of the liquid in a counter direction to the flow of the gaseous medium, and wherein the liquid in its flow is broken into successive stages of flowing jets and flowing films so as to increase the surface of the liquid contacted with by the gaseous medium.

A further object of the invention is to provide an apparatus which is simple in construction and which provides for the continuous flow of the liquid to be treated through the apparatus through the action of centrifugal force thereon, and also a continuous flow of a gaseous medium for treating the liquid in a counterdirection, and wherein means is provided for breaking the flow of the liquid into successive stages of flowing jets and flowing films.

Another object of the invention is to provide an apparatus of the above type which includes a rotating drum, provided with means at the center thereof for receiving the liquid to be treated, and provided with means for introducing the treating gaseous medium to said drum at the peripheral surface thereof under conditions which will cause said gaseous medium to flow in a counterdirection to the flow of the liquid, and wherein said drum is provided with means for breaking the flow of the liquid into stages consisting of flowing jets and flowing films.

Another object of the invention is to provide an apparatus of the above type wherein the treating gaseous medium after it has contacted with the liquid may be drawn from the drum adjacent the center thereof.

Another object of the invention is to provide an apparatus of the above type wherein the means for breaking the flow of the liquid is in the form of spaced concentric surfaces having staggered openings therethrough.

A still further object of the invention is to provide an apparatus of the above type wherein a stationary casing is used in connection with the rotating drum for receiving and feeding the gaseous medium to the drum and for receiving and discharging the liquid after it has been treated in the drum, and wherein there is a liquid seal between the rotating drum and the stationary casing.

These and other objects will in part be obvious and will in part be hereinafter more fully disclosed.

In the drawings which illustrate by way of example, several forms of the invention—

Figure 1 is a vertical section through an apparatus constructed in accordance with the invention on the line 1—1 of Fig. 2;

Fig. 2 is a similar view taken substantially on the line 2—2 of Fig. 1;

Figures 3, 4 and 5 show various arrangements of perforations of one concentric cylindrical surface with comparative arrangements of perforations of another adjacent surface;

Fig. 6 shows an axial section through an apparatus, where both sides of the drum are conical, and Fig. 7 shows an axial section through an apparatus having a double or twin drum fitted into one common stationary casing.

The invention resides in a process of treating liquids with a gaseous medium which consists in causing the liquid to be treated to flow under the action of centrifugal force thereon, whereby a force is continuously acting on the liquid to move the same from an intake for treatment to an outlet after treatment, and causing a gaseous medium to flow in a counterdirection for contacting said liquid, and in breaking the flow of the liquid into successive stages of flowing jets and flowing films. The invention also resides in an apparatus for carrying out the above process, which apparatus comprises a rotating drum having solid side walls between which are disposed concentric surfaces having openings therethrough arranged in staggered relation to each other. Means is provided for supplying the liquid to be treated at the center of the drum so that centrifugal force acting on the liquid will cause it to contact with the concentric surfaces in succession and flow along the surfaces in the form of films and through the surfaces in the form of jets. Associated with the drum is a stationary casing which is so disposed as to close the drum whereby a gaseous treating medium can be presented to the outer face of the concentric surfaces and caused to flow inward through the openings therethrough in a counter direction to the flow of the liquid for treating the same. Said casing is also provided with means through which a treated liquid may be withdrawn after it is discharged from the drum. Means is also provided for withdrawing the gaseous medium from the center portion of the drum after it has contacted with the liquid. A liquid seal is provided between the casing and the drum which is so constructed that said liquid seal rotates with the drum so that centrifugal force operating thereon will produce a very tight seal, preventing the escape of the gaseous treating medium.

It is thought that the invention, both as to the process and the apparatus, will be better understood by a detail description of the apparatus and the operation of the same.

Referring particularly to Figures 1 to 3, the apparatus includes a closed stationary casing $a$, preferably cylindrical, having stuffing-boxes $b$ on its ends, through which extends a rotatable hollow shaft $c$ driven from a suitable source of power through a pulley or the like $e$. Within the casing $a$ and mounted on the shaft $c$ to rotate therewith is a distributing drum $d$.

The drum $d$ includes a plurality of spaced concentric cylindrical surfaces 1, 2, 3, 4, 5, 6, 7, 8 and 9, the number of which may be selected according to the purpose for which the device is to be used. These surfaces are provided with perforations or openings $n$ which are arranged and shaped according to the purpose and conditions to which the treated and treating mediums are subjected, and as specifically described further hereinafter.

The drum $d$ includes solid side plates $f$ which close the spaces between said concentric cylindrical surfaces.

The drum with all its concentrical surfaces is rotated at a high velocity, while the liquid medium is introduced by some suitable distributing means, like a perforated pipe $g$ to the innermost cylindrical surface 1, where, due to the centrifugal force created by rapid rotation, it is spread into a film forcing its way through the perforations and projecting in the form of continuous jets to the next larger surface 2, where it is again spread into a film and forced through the perforations to the next larger surface 3, and so forth until it reaches the largest outside concentrical surface of the drum, from where it is collected by the stationary cylindrical surface of the casing $a$ and withdrawn from the apparatus by way of a drain pipe $h$.

The vapor or any other gaseous medium involved in the process may be introduced into the casing $a$ through a pipe $i$ from where it flows in a counter-current direction to the liquid medium, first through the perforations of the largest cylindrical surface, then through the whole drum from one surface to the other until it reaches the center of the drum and the hollow shaft $c$. The hollow shaft is connected on one side of the casing to a stationary take-off vapor pipe $k$ by means of a gland $l$. The stationary intake pipe $g$ for the liquid medium may be extended into the center of the drum from the gland $l$, or, as shown in Fig. 1, it is connected to the hollow shaft on the opposite side by means of a gland $m$.

It is important that the perforations in the cylindrical surfaces are so located and shaped that an unobstructed passage for both liquid and vapors is realized and a sufficiently large surface of mutual contact is established; also that the concentric surfaces are spaced by a large enough distance to afford the vapors to pass freely without any considerable back-pressure.

In Fig. 3 of the drawings, I have shown the preferred form of arrangement of perforations for treating liquids which may contain suspended solid matters having tendency to clog the apparatus.

The perforations or openings are large enough to allow a simultaneous passage of both liquid and gaseous media. They are placed in a staggered position in relation of one concentric surface to the next neighboring surface. Thus while the liquid being forced by centrifugal force to flow through and around the edges of the perforations, it is projected against the solid part of the next larger concentric surface and there forced to spread into a film while further flowing through the perforations of this surface to the next larger neighboring surface.

From the drawings, it will be seen that I prefer to place the perforations of each surface equally spaced along circumferences perpendicular to the axis of rotation, these circumferences being arranged in staggered positions in relation to the neighboring concentric surfaces. By this arrangement, the projected jets of liquid which may be deviated by tangential forces cannot pass directly to the surfaces farther located than the next larger neighboring surface and escape the stage by stage treatment from one surface to the other while in contact with the simultaneously flowing vapors through the same perforations.

As illustrated in the drawings, the perforations are of a circular shape, although they could be of any other desired shape according to the design and purpose to which my device is applied. It will also be understood that in designing a small apparatus, the circumferential rows of perforations may be substituted by narrow circumferential openings.

In Fig. 4, I have shown an arrangement of perforations for treatment of clean liquids which have no tendency to form solid deposits and to clog the perforations.

Under these conditions, a very efficient contact between liquid and gaseous media can be established by providing very small perforations of a size of 0.03 of an inch in diameter or even less for the passage of liquid only and larger perforations for the passage of gaseous medium. In this Fig. 4, every surface is provided with circumferential zones of small perforations for liquid and single circumferential rows of large perforations for gaseous medium. When the drum rotates at a high velocity, the liquid passes from one cylindrical surface to another, forcing its way through the small perforations in the form of very fine sprays in the direction from the innermost cylindrical surface toward the periphery of the drum. At the same time the vapor passes unobstructedly in zigzag direction through these sprays and the large perforations from one surface to the other, thus being constantly in a very intimate contact with the liquid medium.

In Fig. 5, I have shown another arrangement of perforations for treatment of clean liquids which have no tendency to clog the perforations. As shown in this figure, every cylindrical surface is divided consecutively into circumferential zones of small perforations, circumferential belts of solid (unperforated) surface, circumferential zones of small perforations, and single circumferential rows of large perforations so arranged as to be superposed in the neighboring concentric surfaces by a similar arrangement of perforations, but so that the circumferential rows of large perforations are in alternate position to the circumstantial belts of solid (unperforated) surface, thus establishing a means to force the gaseous medium to pass in zigzag directions through the sprays of liquid forced through the small perforations.

It is evident that by this arrangement shown in Fig. 5, liquid and vapor are subjected to a more efficient fractional treatment from stage to stage at every concentric surface than by the arrangement shown in Fig. 4, whereby every stage of fractional treatment takes place between every other concentrical surface. However, due to the fact that the number of small perforations must be reduced per unit of surface in order to provide space for belts of solid surface, as shown in this Fig. 5, the capacity is reduced from that of the same size of apparatus with the arrangement shown in Fig. 4.

In the operation of the apparatus, the liquid to be treated is not only spread into thin films on a series of surfaces, but the perforations accomplish a further distribution of the liquid into a multitude of thin jets of sprays from one adjoining surface to another. By this distribution of the flowing liquid, a large and efficient surface of contact between the liquid and gaseous media is obtained. Furthermore, the constant mixing and change in shape of liquid and gaseous media during their stage-wise passage from one surface to another in cascade-like and zigzag movement have for the result, an increased co-efficient of heat transfer, and an increased tendency to reach a thermo-dynamic or chemical equilibrium between the treated and treating media.

In the drawings, I have shown the cylindrical surfaces equally spaced from each other. However, the distances may be variable; the distance between adjacent surfaces being calculated with respect to the volume of the gaseous medium passing through the space between said surfaces. Also, the size and number of perforations per unit of surface to be used may be calculated with respect to the amount of liquid to be passed through the surfaces.

In Figures 1 and 2 of the drawings, I have shown the concentric cylindrical surfaces of equal width. Since the areas of concentric surfaces increase stepwise from the inside to the outside of the drum, the liquid is spreading more and more into a thinner and thinner layer, and since the number of perforations on each surface is increasing also, the sprays or jets per perforation are decreasing in intensity and the surface of contact between the liquid and vapor phases may become excessively large at the outer part of the drum. However, this increasing of size of surfaces and number of perforations toward the periphery of the drum will create no disadvantages in many process treatments, like absorption or scrubbing gases, air conditioning, chlorination of liquids by chlorine gas, etc. In certain processes like fractional distillation, where the process of fractionation takes place stepwise from one surface to the other, requiring only a certain adequate surface of contact between the liquid and vapor phase, it is evident that while the inner concentric cylindrical surfaces offer an adequate surface of contact, the outer cylindrical surfaces will be unnecessarily oversized, although without any disadvantage with respect to the process itself. Nevertheless, from the standpoint of construction, such an arrangement would lead to a waste of construction material and to certain difficulties, due to the enormous stress created by centrifugal force, especially when a large apparatus is built, whereby the drum would have to be very heavy and unusually strong, in order to overcome those stresses.

Pursuant to these problems, I found that a very efficient and economical apparatus can be constructed by progressively reducing the width of concentric cylindrical surfaces in proportion as their diameters increase from center of the drum to periphery. Thus the drum is tapered toward its perpihery by building one or both sides of the drum conical or curved, and the widths of zones, rows and belts are decreasing in proportion to the widths of surfaces.

Fig. 6 shows an axial section through such an apparatus. The sides $f, f$ of the drum are conical and the distributing means on each concentric cylindrical surface is represented in its simplest form, consisting only of one circumferential solid (unperforated) belt $r$ and one circumferential zone of small perforations $s$, while the circumferential rows of large perforations for passage of gaseous medium is replaced by a simple circumferential narrow opening $t$, provided alternatively around one end of each concentric cylindrical surface. It will be seen that the width of the zones of perforations gradually decreases as the diameters of the concentric surfaces increase in such a proportion as to maintain the same number of perforations on each surface, or such a number as required for each stage of treatment on each concentric surface.

As shown in this Fig. 6, the stationary casing $a$ is reduced to a simple cylindrical sheet of metal of any suitable construction material. This cylindrical sheet is provided around both edges with double-bent cylindrical strips of metal, dipping freely into a sealing liquid in a circumferential channel, thus forming an hydraulic seal $b$, the channel being rigidly and hermetically attached around each side of the periphery of the rotatable drum and rotating therewith. A liquid of any suitable character may be placed in said channel. When the drum is rotating, the centrifugal force is created on this liquid in the channel and this is what produces an hydraulic seal preventing any escape of the gases from the drum.

In Fig. 7, I have shown a double or twin drum $d$ consisting of two compartments which are separated by a solid partition $p$. Each compartment of the twin drum is provided with cylindrical surfaces similar to those described in connection with Fig. 6. Associated with this double or twin drum construction is a casing $a$ similar to that described in connection with Fig. 6, which is so constructed as to provide an hydraulic seal with each end wall of the twin drum. There is a supply pipe for the liquid leading into each compartment at the axis of the drum. The gaseous treating medium is introduced into the casing through the pipe $i$ and from the casing into each compartment of the drum. The treated liquid is drawn off through the pipe $h$ and the treating gaseous medium is withdrawn through the take-off pipe $k$. In this form of the apparatus, there is, of course, a take-off pipe for each compartment, that is, a take-off pipe at each side of the drum. In both forms of the drum as shown in Figures 6 and 7, the take-off pipe is connected to the hollow shaft forming a part of the drum by a suitable stuffing box, or by a suitable gland $l$. The drum is mounted in suitable bearings for rotation, and is driven by means of a pulley or the like indicated at $e$. It will be understood that the drum as shown in Fig. 6, or as shown in Fig. 7, may be housed within a casing in a manner similar to that shown in Fig. 1.

This form of treating drum with the tapered side walls and the hermetic seal between the drum and the casing, lends itself to the use of the apparatus in the carrying out of the process either under high pressure or high vacuum.

While an ordinary stuffing box may be used between the casing and the rotating shaft, as shown in Fig. 1, I prefer to use a stuffing box of the hydraulic seal type. This stuffing box includes a U-shaped channel member $x$ open all around toward the center or axis of rotation of the drum, and said channel member is hermetically secured to the rotating shaft which supports the drum. A stationary circular partition $y$ firmly and hermetically attached to the casing extends into said channel member and dips into a liquid contained within the channel member. When the channel member rotates, centrifugal force operating upon the liquid therein produces an hydraulic seal which prevents any possible escape of the gases into or from the casing.

While I have shown in the drawings, the drum as rotating about a horizontal axis, it will be understood that the axis may be vertical or otherwise arranged, without affecting the operation thereof.

It is obvious that many changes in the details of construction of the apparatus may be made without departing from the spirit of the invention as set forth in the appended claims. It is also obvious that other forms of apparatus may be used for carrying out the process.

Having thus described the invention, what I claim as new and desire to secure by Letters Patent, is—

1. The process of treating a liquid with a gaseous medium consisting in causing the flow of the liquid to be treated from an intake to an outlet by centrifugal force and causing the gaseous medium to flow in a counter-direction for contacting said liquid, and breaking the flow of the liquid by spaced concentric cylindrical surfaces having staggered closely spaced openings throughout the entire extent of the cylindrical surfaces, said openings being dimensioned so as to permit the liquid and gas to pass in a free unobstructed counter-current through the same openings, said liquid moving at all times in jets through the openings from one surface into contact with the next outwardly adjacent surface so as to flow along the same in a film to an outlet opening in said surface.

2. An apparatus for treating liquids with a gaseous medium comprising a rotatable drum, means for supplying the liquid to be treated to said drum centrally thereof, whereby the liquid is carried outwardly radially of the drum by centrifugal force and discharged at the periphery thereof, means for supplying the gaseous treating medium to the drum at its periphery and for removing the same at the center, said drum being closed at its ends and having a plurality of spaced concentric surfaces therein, each surface throughout the entire extent thereof having closely spaced openings staggered relative to each other in adjacent surfaces and dimensioned so that the gas and liquid pass in a free unobstructed counter-current through said openings, and so that jets of liquid passing through an opening in one surface will contact with the next adjacent outer surface and flow along the same in a film to an outlet opening through said surface.

3. An apparatus for treating liquids with a gaseous medium comprising a rotatable drum, means for supplying the liquid to be treated to said drum centrally thereof, whereby the liquid is carried outwardly radially of the drum by centrifugal force and discharged at the periphery thereof, means for supplying the gaseous treating medium to the drum at its periphery and for removing the same at the center, said drum being closed at its ends and having a plurality of spaced concentric surfaces therein, each surface throughout the entire extent thereof having relatively large non-aligned openings, and small non-aligned openings, said openings being dimensioned so that the gas flows in a zigzag path of least obstruction through the larger openings while the liquid is distributed into sprays through the smaller openings and partly into jets through the larger openings into contact with the next outer surface and along said outer surface in a film to an outlet opening therethrough.

ADOLPH PLACEK.